(12) United States Patent
Berenfeld et al.

(10) Patent No.: US 8,653,247 B2
(45) Date of Patent: *Feb. 18, 2014

(54) RINSABLE DYES AND METHODS FOR THEIR PREPARATION

(75) Inventors: Mark Berenfeld, Belleville, NJ (US); Sal Harfouch, Lodi, NJ (US); Peter Caputo, Lyndhurst, NJ (US)

(73) Assignee: Spectra Colors Corp., Kearny, NJ (US)

( * ) Notice: Subject to any disclaimer, the term of this patent is extended or adjusted under 35 U.S.C. 154(b) by 316 days.

This patent is subject to a terminal disclaimer.

(21) Appl. No.: 12/801,945

(22) Filed: Jul. 2, 2010

(65) Prior Publication Data

US 2012/0004400 A1 Jan. 5, 2012

(51) Int. Cl.
*C07C 245/10* (2006.01)
(52) U.S. Cl.
USPC ........................................... 534/558
(58) Field of Classification Search
USPC ........................................ 548/400; 534/558
See application file for complete search history.

(56) References Cited

U.S. PATENT DOCUMENTS

| | | | |
|---|---|---|---|
| 2,038,298 A | 4/1936 | Kiernan | |
| 3,157,633 A | 11/1964 | Kuhn | |
| 3,449,319 A | 6/1969 | Kuhn | |
| 3,451,762 A * | 6/1969 | Tamer et al. | 8/589 |
| 4,091,034 A | 5/1978 | Kuhn | |
| 4,102,639 A | 7/1978 | Zenhausern et al. | |
| 4,102,644 A | 7/1978 | Hauser et al. | |
| 4,113,721 A | 9/1978 | Hauser et al. | |
| 4,141,684 A | 2/1979 | Kuhn | |
| 4,144,028 A | 3/1979 | Hauser et al. | |
| 4,167,510 A * | 9/1979 | Brendle | 534/729 |
| 4,400,320 A | 8/1983 | Keller et al. | |
| 4,877,411 A | 10/1989 | Hines et al. | |
| 5,043,013 A * | 8/1991 | Kluger et al. | 106/31.32 |
| 5,059,244 A | 10/1991 | King et al. | |
| 6,031,023 A | 2/2000 | Carroll et al. | |

* cited by examiner

*Primary Examiner* — Yong Chu
*Assistant Examiner* — Sonya Wright
(74) *Attorney, Agent, or Firm* — Thomas J. Germinario

(57) ABSTRACT

Rinsable dyes with improved fugitivity are formulated by attaching dyestuff compounds with amine-capped sulfonic solubilizing groups to commercially available ethoxylated aniline, so that the surfactant effect of the ethoxylated aniline counteracts the substantivity of the dyestuff compound, while the neutralization of the sulfonic solubilizing groups reduces substantivity.

6 Claims, No Drawings

RINSABLE DYES AND METHODS FOR THEIR PREPARATION

BACKGROUND OF THE INVENTION

The present invention relates to the field of fugitive dyes, and more particularly to the class of fugitive dyes that are prepared by attaching a dyestuff compound or ion to a water-soluble polymeric compound.

Dyes that are capable of imparting an intense yet removable color to a substrate are useful in a number of applications, including fugitive tinting of fabrics in textile manufacturing and temporary markers for arts and crafts. Dyes that are washable, in the sense of being removable from the substrate by scrubbing with aqueous soap or detergent, have been known in the art for nearly 50 years. The patent to Kuhn (U.S. Pat. No. 3,157,633), issued in 1964, taught a new class of chromophoric surfactants, in which one or more water-soluble polymeric groups comprising multiple ethyleneoxy units are coupled to a dyestuff moiety. In the Kuhn dye formulations, the surface active properties of the polymeric groups are used to counteract the affinity of the dyestuff radical for the substrate in order to produce a washable dye.

The Kuhn patent also discloses that the fugitivity of these polyethyleneoxy tints is improved when the dyestuff compound contains at least one sulfonic acid group ($SO_3^-$) to increase solubility. The patent to Brendle (U.S. Pat. No. 4,167,510) similarly teaches that the presence of strongly acidic ($pK_a<3$) ionic groups (e.g. sulfonates or phosphates) in the dyestuff compound increases water-solubility, and hence fugitivity. While both Kuhn and Brendle aim to enhance fugitivity by making the dyestuff compound more soluble, however, the presence of a strongly acidic solubilizing group, such as sulfonic acid, in the dyestuff moiety actually increases its affinity for the substrate (its "substantivity"), thereby limiting the fugitivity of the dye.

Dye molecules ("chromogens") are aromatic compounds comprising one or more aryl rings with delocalized p-orbital electron systems. The delocalized electron system of a given aryl ring will maximally absorb electromagnetic radiation at a characteristic wavelength $\lambda_{max}$. For example, an isolated benzene ring will maximally absorb electromagnetic radiation at a wavelength $\lambda_{max}$ of 254 nm, which is in the ultraviolet (UV) portion of the electromagnetic spectrum. Therefore, liquid benzene appears colorless, because the human eye does not detect UV radiation. On the other hand, the alkaline form of the acid-base indicator methyl orange, which is an azo-benzene comprising two phenyl rings linked by an N=N bond, has a $\lambda_{max}$ of 440 nm, which falls within the visible range of the electromagnetic spectrum (390-750 nm). When 440 nm wavelength light (blue) is removed from the visible spectrum, the complementary color (yellow) is observed, and thus alkaline methyl orange appears yellow.

Benzene and azo-benzene are examples of organic compounds having conjugated systems of alternating single and double covalent bonds. The more extended the conjugated system is, i.e., the greater the number of alternating single and double bonds, the longer will be the peak electromagnetic absorption wavelength $\lambda_{max}$ of the compound. This is because the extent of π-electron delocalization increases with the extent of conjugation, because conjugation produces an overlapping system of p-orbitals. With increasing delocalization, the energy difference between the π (bonding) and π* (antibonding) orbitals is reduced. Since the energy E of a photon absorbed by a π electron in jumping to a π* orbital is related to the photon's wavelength by the expression $E=hc/\lambda$ (where h is Planck's constant and c is the speed of light), increasing π electron delocalization results in electromagnetic absorption at longer peak wavelengths. Consequently, extension of the conjugated system tends to shift the peak absorption wavelength $\lambda_{max}$ toward the red end of the visible spectrum, which causes a complementary shift toward the violet end of the spectrum in the observed color associated with a dye compound.

In addition to extension of conjugated systems of single/double bonds, electron delocalization in a dye compound can also be increased by the presence in the molecule of functional groups or substituents having lone pairs of electrons, since these non-bonding n-electrons can also be promoted to a π* orbital at the lower transition energy levels associated with electromagnetic wavelengths in the visible range. Lone pair electrons often occur in O, N or S atoms in groups such as —OH, —$NH_2$, —NHR, —$NR_2$, and —SH (where R is an alkyl or aryl group).

The chromophore is the portion of a dye molecule that contains its color-producing moiety, which has delocalized it electrons shared among conjugated aromatic rings. Important chromophoric functional groups are —N=N-(azo), —C=C— (ethenyl), —C=O— (carbonyl), —C=N-(amino), —O=N—O— (nitro). The intensity of the color depends on the number of such chromophoric groups. Benzene, for example, is colorless because it lacks a chromophore, but the presence of the chromophoric nitro group in nitrobenzene imparts a pale yellow color to the molecule.

Auxochromes are functional groups with non-bonded electrons that have the effect of deepening and intensifying the color produced by the chromophores to which they are attached. Going back to our example of pale yellow nitrobenzene, if we attach an hydroxyl (—OH) radical to the chromophore, the hydroxyl group functions as an auxochrome, and the resulting compound, p-hydroxynitrobenzene, exhibits a deep yellow color. Moreover, if an auxochrome with lone-pair electrons is in direct conjugation with the delocalized π-electron system of the chromophore, it can extend the conjugated system and increase the peak absorption wavelength $\lambda_{max}$ of the chromophore, thereby altering or adjusting the color.

While the presence of chromophores in a conjugated aromatic system is sufficient to provide color, it is not sufficient to constitute a dye. A dye, in addition to having color, must also have the ability to penetrate and bond to a substrate. To do this, the dye molecule must contain functional groups that can ionize so as to provide solubility and substantivity. These functional groups, which are attached to the chromophore, are called solubilizing groups. Solubilizing groups can either be acidic, such as the sulfonic radical —$HSO_3$, or a neutral salt, such as sodium sulfonate $NaSO_3^-$.

By controlling both the solubility and substantivity of the chromogen, solubilizing groups hold the key to optimizing the fugitivity of a dye. Heretofore, the prior art fugitive dye formulations have exploited only the solubilizing function in selecting solubilizing groups. By neglecting substantivity, however, the existing formulations have limited the degree of achievable fugitivity to so-called "washability", which means that the substrate has to be subjected to scrubbing or agitation in the presence of soap or detergent in order to remove the dye color. On the other hand, dyes formulated in accordance with the present invention exhibit "rinsability", which means that the dye color can be removed by simply rinsing the substrate in water or under running water.

Rinsability, as opposed to washability, has several practical advantages. For example, fugitive dyes incorporated in children's art supplies, such as markers and finger paints, will stain skin and clothing, as well as furniture and carpeting. The ability to rinse away such stains under a faucet or hose provides a level of convenience not afforded by washable dyes. Similarly, in commercial applications, such as fugitive tint textile marking, rinsable dyes can shorten process times and cut production costs significantly.

SUMMARY OF THE INVENTION

One objective of the present invention is to produce rinsable dyes by imparting surface active properties to the dye molecules, thereby increasing their water solubility. This objective is accomplished by attaching dyestuff compounds comprising conjugated aryl rings to one or more polymeric or copolymeric alkyleneoxy chains, which act as surfactants and counteract the substantivity of the dyestuff compound.

A second objective of the present invention is to produce rinsable dyes by imparting ionizing properties to the dye molecules, thereby increasing their water solubility. This objective is accomplished by formulating dyestuff compounds which comprise multiple conjugated aryl rings and which have one or more solubilizing groups, comprising acidic ionic groups or salts thereof.

A third objective of the present invention is to produce rinsable dyes by reducing the affinity of the dyestuff compounds for their substrates, i.e., by reducing the substantivity of the dyestuff moiety. This objective is accomplished by capping some or all of the solubilizing groups with a neutralizing basic ionic group or a salt thereof, so that the dye molecules become less reactive with the substrate and do not bond as strongly to the substrate.

A fourth objective of the present invention is to produce rinsable dyes with deep, intense colors. This objective is accomplished by formulating dyestuff compounds in which each of the auxochromes is a subtituent in one of the multiple aryl rings, so that the auxochromes provide lone-pair electrons which extend the conjugated system of the dyestuff moiety.

A fifth objective of the present invention is to produce rinsible dyes with a variety of color gradations. This objective is accomplished by formulating dyestuff compounds having auxochromes that are directly connected to one of the aryl rings and have lone-pair electrons in direct conjugation with the delocalized π-electron system of the chromophore, so as to extend the chromophore's conjugated system. This objective is also accomplished by varying the number of alkyleneoxy units in the surfactant polymeric chain(s) attached to the dyestuff moiety.

Dyestuffs of the present invention formulated in accordance with the foregoing criteria have the general formula:

$$[(AO)_nH]_x\text{—N-D}\{\text{-N-}[(AO)_nH]_x\}$$

Where { } brackets indicate an optional component. AO represents alkyleneoxy polymeric or copolymeric units, preferably repeating ethyleneoxy units. The number n of alkyleneoxy units in each polymeric/copolymeric chain can be from 5 to 100, preferably 5 to 25. The number x of polymeric chains can be 1 or 2, preferably 2. D is a dyestuff radical or ion comprising a conjugated system of aryl rings, preferably phenyl rings, with one or more solubilizing ionic substituents.

The dyestuff moiety D can be a chromophore comprising any conjugated system of aryl rings, including without limitation, the following standard dye classes: nitro, azo, azoic with coupling component, diphenylmethane, triarylmethane, triphenylmethane, xanthenes, acridine, quinoline, methine, thiazole, indamines, azine, oxazine, thiazine, lactone, anthraquinone, or indigoid.

Preferably, the dyestuff moiety is an azo or a triarylmethane. For the azo dyes of the present invention, the general formula for the dyestuff moiety is $$(Ar)_p\text{-N}=\text{N—}[(Ar)\text{-}G_r]_q$$

Where $(Ar)_p$ is a conjugated system of p aryl rings (Ar), preferably phenyl rings, and where $[(Ar)\text{-}G_r]_q$ is a conjugated system of q aryl rings (Ar), preferably phenyl, with each aryl ring having r solubilizing groups (G). The solubilizing groups comprise capped and uncapped acidic ionic groups and/or salts thereof, wherein the capped solubilizing groups are preferably amine sulfonates. The number p of aryl rings without solubilizing groups can be 1 to 5, preferably 1 to 3. The number q of aryl rings with solubilizing groups can be 1 to 10, preferably 1 to 5. The number of solubilizing groups per ring r (which can be different for each ring) can be 0 to 3.

For triarylmethane dyes of the present invention, the general formula of the dyestuff radical is

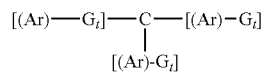

Where $[(Ar)\text{-}G_t]$ is an aryl ring, preferably phenyl, with t solubilizing groups (G). The solubilizing groups comprise capped and uncapped acidic ionic groups and/or salts thereof, wherein the capped solubilizing groups are preferably amine sulfonates. The number of solubilizing groups per ring t (which can be different for each ring) can be 0 to 2, preferably 0 or 2.

In the following section, examples are provided of preferred embodiments of rinsable dyes in accordance with the present invention. It is to be understood, however, that these examples are for illustrative purposes only and are not to be construed as limiting the scope of the present invention.

DETAILED DESCRIPTION OF THE PREFERRED EMBODIMENTS

Example 1

Rinsable Yellow Dye

The process of formulating Rinsable Yellow Dye according to the present invention comprises 3 stages: (1) diazotization, (2) coupling and (3) filtration.

Stage 1. Diazotization of Metanilic Acid

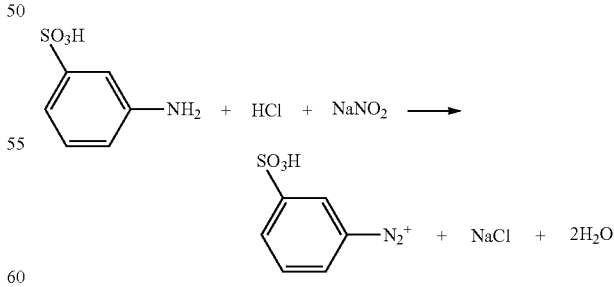

In a kettle, add water 41.56 mL and start to agitate. Then add metanilic acid 35.95 g (as 100%), hydrochloric acid 32.68 g (as 20 Be'), and ice 41.56 g. In a separate kettle, make a solution of sodium nitrite 15.05 g in water 31.17 mL, and drop this solution slowly into the reaction mass prepared above. Stir the mixture for 2 hours with positive reaction on Congo and potassium iodide-starch test papers. Temperature is not supposed to exceed 10 deg C. At the end of reaction destroy the excess of sodium nitrite with 2.08 g of amidosulfonic acid.

Stage 2. Coupling of Ethox with Metanilic Acid Diazonium Salt

Ethoxylated aniline (Ethox) is a commercially available product with a structure as follows:

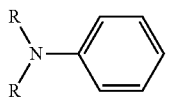

R is a variable number of Ethoxy groups.

In a kettle, add Ethox 716.85 g and start to agitate. Slowly transfer metanilic acid diazonium salt (Product of Stage 1) to the kettle with Ethox in it. Neutralize the reaction mass with 83.1 g of ethanolamine.

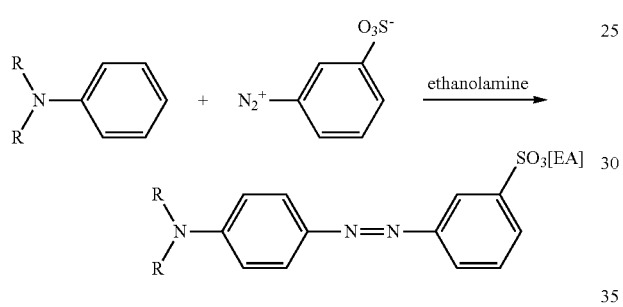

Where [EA]=ethanolamine, which is generic and includes mono-, di- and triethanolamine.

Stage 3. Filtration

Filter Rinsable Yellow Dye (Product of Stage 2).

Example II

Rinsable Red Dye

The process of formulating Rinsable Red Dye according to the present invention comprises 6 stages: (1) acetylation, (2) diazotization, (3) coupling, (4) first condensation, (5) second condensation and (6) filtration.

Stage 1. Acetylation of H-acid

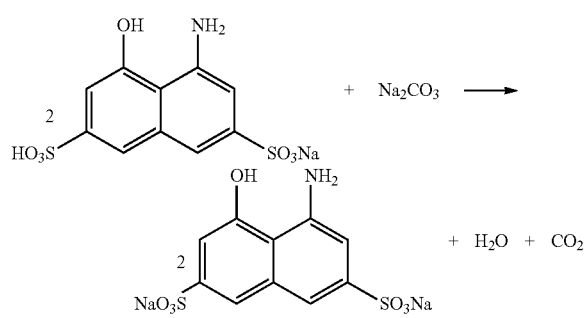

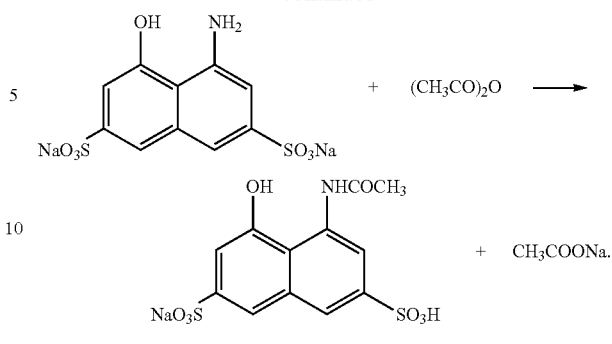

In a kettle, add water 84.37 mL at 50 deg C. and start to agitate. Then add H-acid 58.38 g (as 100%), soda ash 13.5 g, and stir until dissolved. Under the surface add acetic anhydride 29.53 g and agitate until acetylation is complete.

Stage 2. Diazotization of Aniline-2,5-disulfonic Acid

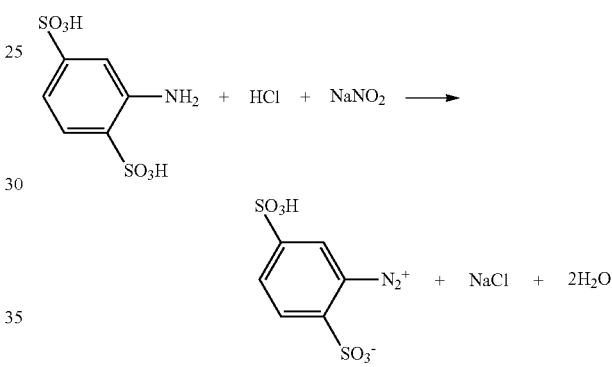

In a kettle, add water 67.49 mL and start to agitate. Then add aniline-2,5-disulfonic salt 42.69 g (as 100%), hydrochloric acid 30.71 g (as 20 Be'), and ice 67.49 g. In a separate kettle, make a solution of sodium nitrite 12.23 g in water 25.32 mL, and drop this solution slowly into the reaction mass prepared above. Stir the mixture for 2 hours with positive reaction on Congo and potassium iodide-starch test papers. Temperature is not supposed to exceed 10 deg C. At the end of reaction destroy the excess of sodium nitrite with 2.53 g of amidosulfonic acid.

Stage 3. Coupling of Acetyl-H acid with Aniline-2,5-disulfonic Acid Diazonium Salt

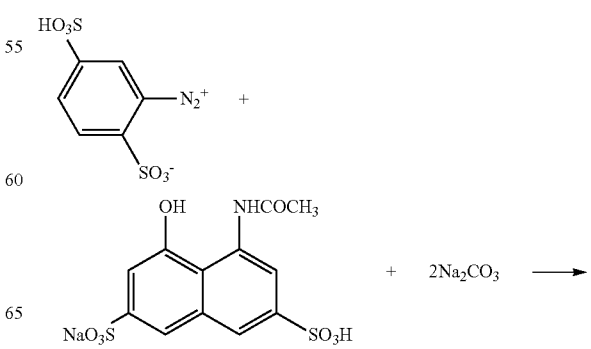

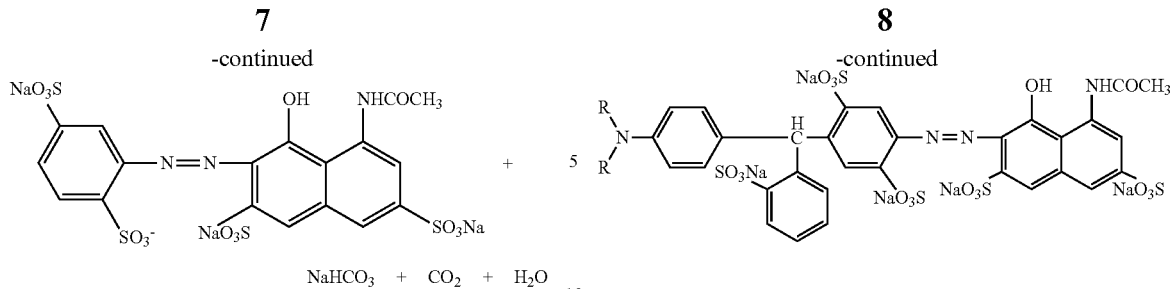

NaHCO₃ + CO₂ + H₂O

Add soda ash 33.74 g to the kettle with acetyl-H acid solution (Product of Stage 1) under agitation. Slowly add to the kettle aniline-2,5-disulfonic acid diazonium salt (Product of Step 2) and stir the coupling for at least 4 hours.

Stage 4. Condensation of Coupling (Stage 3) with 2-Formylbenzenesulfonic Acid

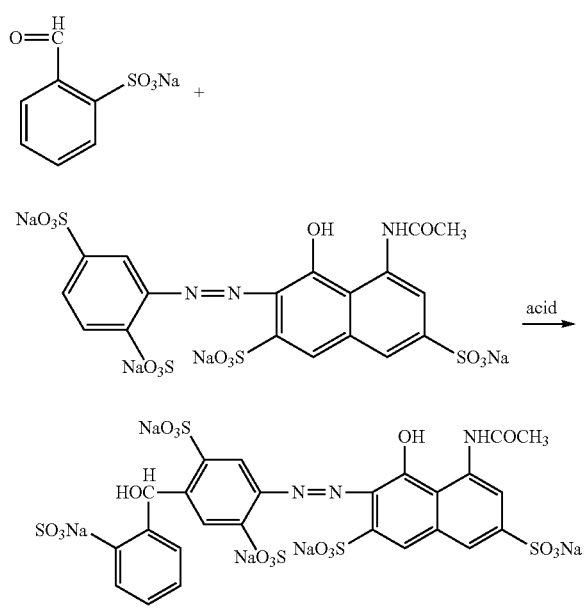

Under agitation, acidify the Coupling (Product of Stage 3) to a pH of around 4, then add 2-formylbenzenesulfonic acid 35.1 g (as 100%). Heat the reaction mass to 100 deg C. and reflux for 5 hours.

Stage 5. Condensation Product of Stage 4 with Ethox

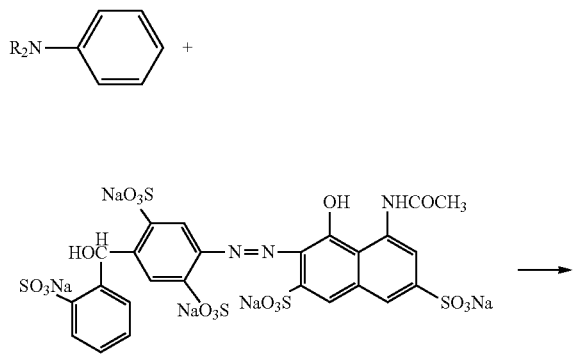

Add Ethox 392.31 g to the kettle with the Product of Stage 4 at 100 deg C. and reflux for 5 hours. When reaction is completed, cool the reaction mass down and neutralize with ethanolamine to pH=8.0-8.5.

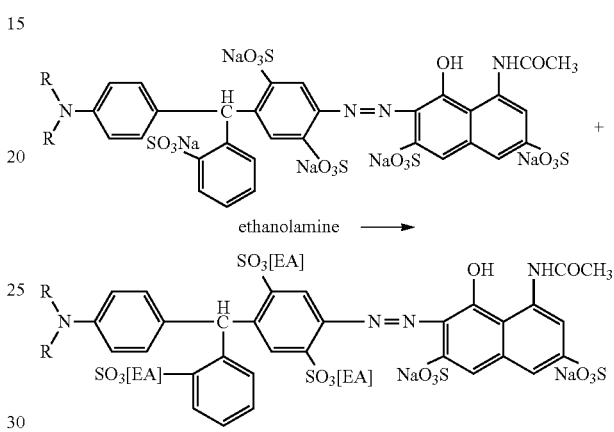

Stage 6. Filtration
Filter Rinsable Red Dye (Product of Stage 5).

Example III

Rinsable Blue Dye

The process of formulating Rinsable Blue Dye according to the present invention comprises 3 stages: (1) condensation, (2) oxidation and neutralization and (3) filtration.

Stage 1. Condensation of Ethox with 4-Formylbenzene-1,3-disulfonic Acid

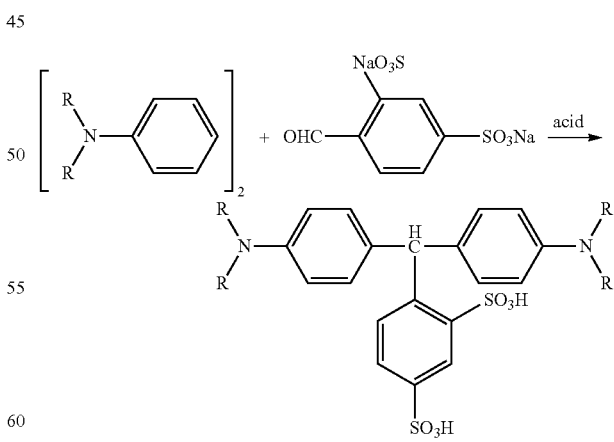

In a kettle, add Ethox 557.59 g and start to agitate, then acidify the batch, and then add 4-formylbenzene-1,3-disulfonic acid 81.02 g (as 100%). Heat the batch to above 100 deg C. and keep the temperature stable until the reaction is completed.

Stage 2. Oxidation and Neutralization

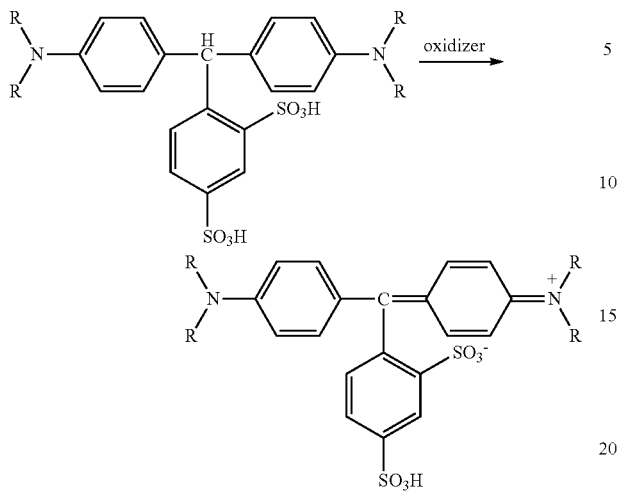

Oxidize the Leuco compound (Product of Step 1) with an appropriate oxidizer at a temperature above 100 deg C. When the reaction is completed, cool the reaction mass down, and neutralize the excess of the acid with ethanolamine.

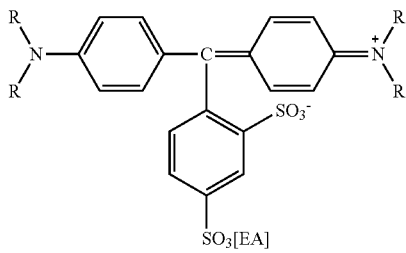

Stage 3. Filtration

Filter Rinsable Blue Dye (Product of Stage 2).

Although the preferred embodiments of the present invention have been disclosed for illustrative purposes, those skilled in the art will appreciate that many additions, modifications and substitutions are possible, without departing from the scope and spirit of the present invention as defined by the accompanying claims.

What is claimed is:

1. A rinsable dye compound of the formula:

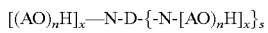

[$(AO)_nH$]$_x$—N-D-{-N-[$AO)_nH$]$_x$}$_s$ wherein s is an integer 0 or 1; AO are alkyleneoxy polymeric or copolymeric units; n is an integer from 5 to 100; x is an integer 1 or 2; and wherein D is a dyestuff compound comprising a conjugated system of multiple aryl rings and one or more chromophoric functional groups; and wherein one or more of the aryl rings contains one or more substituents, which are capped solubilizing groups, wherein the substituent capped solubilizing groups comprise a sulfonic group ($SO_3^-$) combined with an ethanolamine, selected from mono-, di- and triethanolamine, to form mono-, di- or triethanolamine sulfonate.

2. The rinsable dye compound of claim 1, wherein the aryl rings are phenyl.

3. The rinsable dye compound of claim 2, wherein AO are polymeric ethyleneoxy chains.

4. The rinsable dye compound according to claim 3, of the formula:

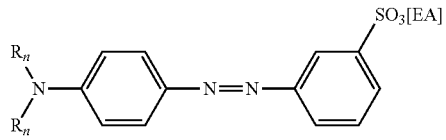

wherein $R_n$ are n polymeric ethyleneoxy units; n is an integer from 5 to 100; and is an ethanolamine selected from mono-, di- and triethanolamine.

5. The rinsable dye compound according to claim 3, of the formula:

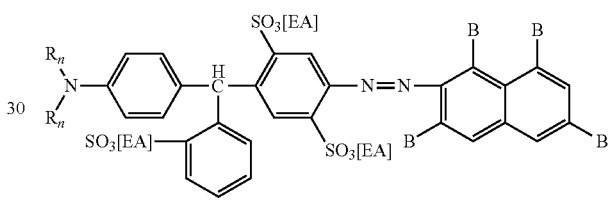

wherein $R_n$ are n polymeric ethyleneoxy units; n is an integer from 5 to 100; is an ethanolamine selected from mono-, di- or triethanolamine; and B is selected from the group OH, $NHCOCH_3$ and $NaSO_3$.

6. The rinsable dye compound according to claim 3, of the formula:

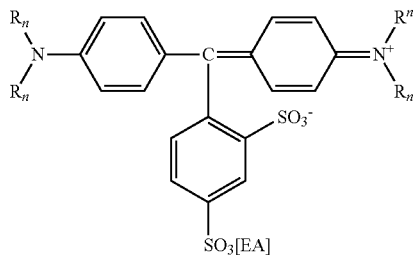

wherein $R_n$ are n polymeric ethyleneoxy units; n is an integer from 5 to 100; and is an ethanolamine selected from mono-, di- or triethanolamine.

* * * * *